(12) United States Patent
Tucker et al.

(10) Patent No.: US 12,158,191 B2
(45) Date of Patent: Dec. 3, 2024

(54) THROUGH TUBE ACTIVE SUSPENSION ACTUATOR

(71) Applicant: ClearMotion, Inc., Billerica, MA (US)

(72) Inventors: Clive Tucker, Charlestown, MA (US); Kevin Ryan McGuinness, Tewksbury, MA (US); Zhenrong Wang, Newton, MA (US); Andrew Martin Wizorek, Reading, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 18/541,237

(22) Filed: Dec. 15, 2023

(65) Prior Publication Data

US 2024/0344580 A1 Oct. 17, 2024

Related U.S. Application Data

(63) Continuation of application No. 16/975,465, filed as application No. PCT/US2019/019616 on Feb. 26, 2019, now Pat. No. 11,892,051.

(Continued)

(51) Int. Cl.
*F16F 9/19* (2006.01)
*B60G 17/08* (2006.01)
(Continued)

(52) U.S. Cl.
CPC ............... *F16F 9/19* (2013.01); *B60G 17/08* (2013.01); *F16F 9/18* (2013.01); *F16F 9/34* (2013.01);
(Continued)

(58) Field of Classification Search
CPC ........ F16F 9/18; F16F 9/19; F16F 9/34; F16F 9/44; F16F 9/46; F16F 9/446; F16F 9/50;
(Continued)

(56) References Cited

U.S. PATENT DOCUMENTS 3,598,206 A 8/1971 Hennells
3,840,097 A 10/1974 Holley
(Continued)

FOREIGN PATENT DOCUMENTS

DE 19920109 A1 11/2000
DE 102004056610 A1 6/2006
(Continued)

OTHER PUBLICATIONS

International Search Report and Written Opinion for International Application No. PCT/US2019/019616 dated Apr. 18, 2019.

*Primary Examiner* — Christopher P Schwartz
(74) *Attorney, Agent, or Firm* — Wolf, Greenfield & Sacks, P.C.

(57) ABSTRACT

Disclosed herein are active hydraulic cylinders for use in active vehicle suspension systems, and methods for assembling active hydraulic cylinders for use in an active vehicle suspension system. In particular, in certain embodiments a manifold may encircle a portion of an outer tube of a twin tube assembly. The manifold may mechanically and fluidly couple a pump assembly to the twin tube assembly. In certain embodiments, the manifold may be welded onto the outer tube.

12 Claims, 5 Drawing Sheets

Related U.S. Application Data

(60) Provisional application No. 62/636,149, filed on Feb. 27, 2018.

(51) Int. Cl.
   *F16F 9/18* (2006.01)
   *F16F 9/34* (2006.01)
   *F16F 9/50* (2006.01)

(52) U.S. Cl.
   CPC .......... *F16F 9/50* (2013.01); *B60G 2202/154* (2013.01); *B60G 2202/24* (2013.01); *B60G 2202/25* (2013.01); *B60G 2206/82* (2013.01)

(58) Field of Classification Search
   CPC ...... B60G 11/265; B60G 13/08; B60G 17/08; B60G 2202/24; B60G 2202/25; B60G 2202/154; B60G 2206/82
   USPC .......................... 188/322.13, 322.19, 322.2
   See application file for complete search history.

(56) References Cited

U.S. PATENT DOCUMENTS

| | | | |
|---|---|---|---|
| 5,028,073 A | 7/1991 | Harms et al. | |
| 5,329,767 A | 7/1994 | Hewett | |
| 5,351,790 A * | 10/1994 | Machida | B60G 13/003 188/266.2 |
| 5,682,980 A | 11/1997 | Reybrouck | |
| 5,848,676 A | 12/1998 | Deigner | |
| 6,283,259 B1 | 9/2001 | Nakadate | |
| 6,443,272 B1 | 9/2002 | Rottenberger et al. | |
| 6,519,939 B1 | 2/2003 | Duff | |
| 6,796,120 B2 | 9/2004 | Franchet et al. | |
| 6,811,168 B2 | 11/2004 | Acker et al. | |
| 7,051,526 B2 | 5/2006 | Geiger | |
| 7,631,736 B2 | 12/2009 | Thies et al. | |
| 7,883,546 B2 | 2/2011 | Kazerooni et al. | |
| 7,942,225 B2 | 5/2011 | Carabelli et al. | |
| 8,776,961 B2 | 7/2014 | Mori et al. | |
| 9,108,484 B2 | 8/2015 | Reybrouck | |
| 9,821,623 B1 | 11/2017 | Liao | |
| 10,400,844 B2 | 9/2019 | Schmidt et al. | |
| 11,242,907 B2 | 2/2022 | Ruhmann et al. | |
| 11,892,051 B2 | 2/2024 | Tucker et al. | |
| 2004/0094376 A1 | 5/2004 | van Wonderen et al. | |
| 2004/0134730 A1 | 7/2004 | Forster | |
| 2005/0173213 A1 | 8/2005 | Coquet | |
| 2007/0089924 A1 | 4/2007 | de la Torre et al. | |
| 2008/0051958 A1 | 2/2008 | Pelchen et al. | |
| 2008/0190104 A1 | 8/2008 | Bresie | |
| 2009/0032346 A1 | 2/2009 | Nowaczyk | |
| 2009/0260935 A1 | 10/2009 | Avadhany et al. | |
| 2010/0072760 A1 | 3/2010 | Anderson et al. | |
| 2010/0262308 A1 | 10/2010 | Anderson et al. | |
| 2014/0265168 A1 | 9/2014 | Giovanardi et al. | |
| 2014/0265203 A1 | 9/2014 | Zuleger et al. | |
| 2015/0158364 A1 | 6/2015 | King et al. | |
| 2019/0145486 A1 | 5/2019 | McCoy et al. | |
| 2020/0173513 A1 | 6/2020 | Woenarta | |
| 2021/0018057 A1 | 1/2021 | Tucker et al. | |
| 2021/0381570 A1 | 12/2021 | Zeissner et al. | |
| 2023/0111977 A1 | 4/2023 | Boon et al. | |

FOREIGN PATENT DOCUMENTS

| | | |
|---|---|---|
| DE | 102009016210 A1 | 10/2010 |
| DE | 102010023434 A1 | 12/2011 |
| JP | 2021-99123 A | 7/2021 |
| WO | WO 2010/066416 A1 | 6/2010 |
| WO | WO 2011/154026 A1 | 12/2011 |
| WO | WO 2011/159874 A2 | 12/2011 |
| WO | WO 2014/145018 A2 | 9/2014 |
| WO | WO 2019/241650 A1 | 12/2019 |
| WO | WO 2021/260586 A1 | 12/2021 |
| WO | WO 2022/234285 A1 | 11/2022 |

* cited by examiner

THROUGH TUBE ACTIVE SUSPENSION ACTUATOR

CROSS-REFERENCE TO RELATED APPLICATIONS

This application is a continuation of U.S. application Ser. No. 16/975,465, filed Aug. 25, 2020, which is a national stage filing under 35 U.S.C. § 371 of International Patent Application Serial No. PCT/US2019/019616, filed Feb. 26, 2019, which claims the benefit of priority under 35 U.S.C. § 119(e) of U.S. Provisional Application Ser. No. 62/636,149, filed Feb. 27, 2018, the disclosures of each of which are incorporated herein by reference in their entirety.

FIELD

Embodiments described herein relate to components of an active suspension system and assembly thereof.

BACKGROUND

Active vehicle suspension systems may include one or more active hydraulic cylinders arranged between a wheel assembly of a vehicle and the vehicle body. Compared to passive hydraulic dampers, active hydraulic cylinders may include additional components such as, for example, pumps, accumulators, valves, etc. These additional components may result in more complex manufacturing processes and higher system costs for active suspension systems that utilize hydraulic actuators as compared to passive or semi-active suspension systems that utilize conventional hydraulic dampers. Higher system cost may preclude mass commercial adoption of hydraulic active vehicle suspension systems.

SUMMARY

In one aspect, a method for assembling a component for an active hydraulic cylinder for use in an active suspension system is disclosed. In certain embodiments, the method may include (a) inserting a first end of an outer tube through a substantially circular opening of a manifold; (b) aligning a first plurality of apertures in a surface of the circular opening with a second plurality of apertures in a wall of the outer tube; and (c) affixing the manifold to the outer tube. In certain embodiments, the outer tube may be constructed out of a first material of construction and the manifold may be constructed out of a second material of construction. In certain embodiments, as the outer tube is configured to carry tensile and compressive loads, the first material of construction may have a tensile strength (e.g., ultimate tensile strength), compressive strength (e.g., ultimate compressive strength), and/or yield strength that is greater than the second material of construction (e.g., as measured by ISO 6892-1 or ASTM E8). In certain embodiments, the second material of construction may be have a density less than that of the first material of construction. In certain embodiments, the outer tube is constructed of steel and the manifold is constructed of aluminum or an alloy thereof. In certain embodiments, the method further comprises inserting a piston into a pressure tube, wherein the piston is attached to a piston rod; and inserting the pressure tube into the outer tube, such that an annular volume is defined between at least a portion of the outer tube and at least a portion of the pressure tube.

In certain embodiments, the method further comprises attaching a pump assembly to a first mounting section of the manifold, wherein the pump assembly includes a pump and a pump housing. In certain embodiments, the method further comprises plugging one end of the outer tube with a body cap that includes an eyelet. In certain embodiments, step (c) above comprises welding the manifold to the outer tube. In certain embodiments, electromagnetic pulse welding may be used to affix the manifold to the outer tube. In certain embodiments, the manifold may be affixed to the outer tube using one or more threaded locknuts. In certain embodiments, the pump assembly is attached to the first mounting section of the manifold via one or more threaded fasteners. In certain embodiments, the method may include, prior to step (a), inserting an o-ring into a groove of the surface of the circular opening of the manifold.

In another aspect, a method for assembling a component for an active hydraulic cylinder for use in an active suspension system is disclosed, the method comprising: (a) inserting a first end of a body cap through a substantially circular opening of a manifold; (b) aligning a first plurality of apertures through a surface of the circular opening with a second plurality of apertures through a wall of the body cap; and (c) affixing the manifold to the body cap. In certain embodiments, the body cap is constructed of steel and the manifold is constructed of aluminum or an alloy thereof. In certain embodiments, the method further comprises: plugging a first end of an outer tube with the body cap; inserting a piston into a pressure tube, wherein the piston is attached to a piston rod; and inserting the pressure tube into the outer tube, such that an annular volume is defined between the outer tube and the pressure tube. In certain embodiments, the method further comprises attaching a pump assembly to a first mounting section of the manifold, wherein the pump assembly includes a pump and a pump housing. In certain embodiments, the method includes affixing the manifold to the body cap using one or more threaded locknuts. In certain embodiments, the method includes welding the manifold to the body cap. In certain embodiments, the electromagnetic pulse welding may be used to affix the manifold to the body cap. In certain embodiments, the pump the pump assembly is attached to the first mounting section of the manifold via one or more threaded fasteners. Optionally, the method may include, prior to inserting the first end of the body cap through the substantially circular opening of the manifold, inserting an o-ring into a groove in the surface of circular opening of the manifold.

In another aspect, an active hydraulic cylinder for use in an active suspension system is disclosed, the active hydraulic cylinder comprising: an outer tube surrounding at least a portion of a length of a pressure tube, such that an annular volume is at least partially defined by an inner surface of the outer tube and an outer surface of the pressure tube; a manifold surrounding a portion of the outer tube, wherein the manifold includes a series of flow channels and a first mounting section; and a pump assembly mounted onto the first mounting section of the manifold, wherein the pump assembly includes a pump housing and a pump having a first port and a second port. In certain embodiments, the active hydraulic cylinder further comprises: a piston inserted into the pressure tube, therefore dividing the pressure tube into a compression chamber and an extension chamber; a first plurality of apertures through a wall of the outer tube; a first flow path that allows fluid flow from the first port of the pump into the compression chamber, wherein the first flow path includes: the first port of the pump, a first flow channel through the manifold, a first aperture through a wall of the outer tube, and a first portion of the annular volume; a second flow path that allows for fluid flow from the second port of the pump into the extension chamber, wherein the second flow path includes: the second port of the pump, a second flow channel through the manifold, a second aperture through a wall of the outer tube, and a second portion of the annular volume; wherein the pressure tube is at least partially filled with hydraulic fluid. In certain embodiments, the active hydraulic cylinder may also include an o-ring that hydraulically seals the first portion of the annular volume from the second portion of the annular volume. In certain embodiments, the manifold includes a second mounting section, and the active hydraulic cylinder further comprises an accumulator assembly attached to a second mounting section of the manifold. In certain embodiments, the first flow path includes a base valve located at a base of the pressure tube. In certain embodiments, the second flow path includes an opening in a wall of the pressure tube. In certain embodiments, the active hydraulic cylinder further includes a bypass flow path that allows for fluid flow between the compression chamber and the extension chamber without passing through the pump, wherein the bypass flow path includes a third fluid channel through the manifold.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Figure 1:
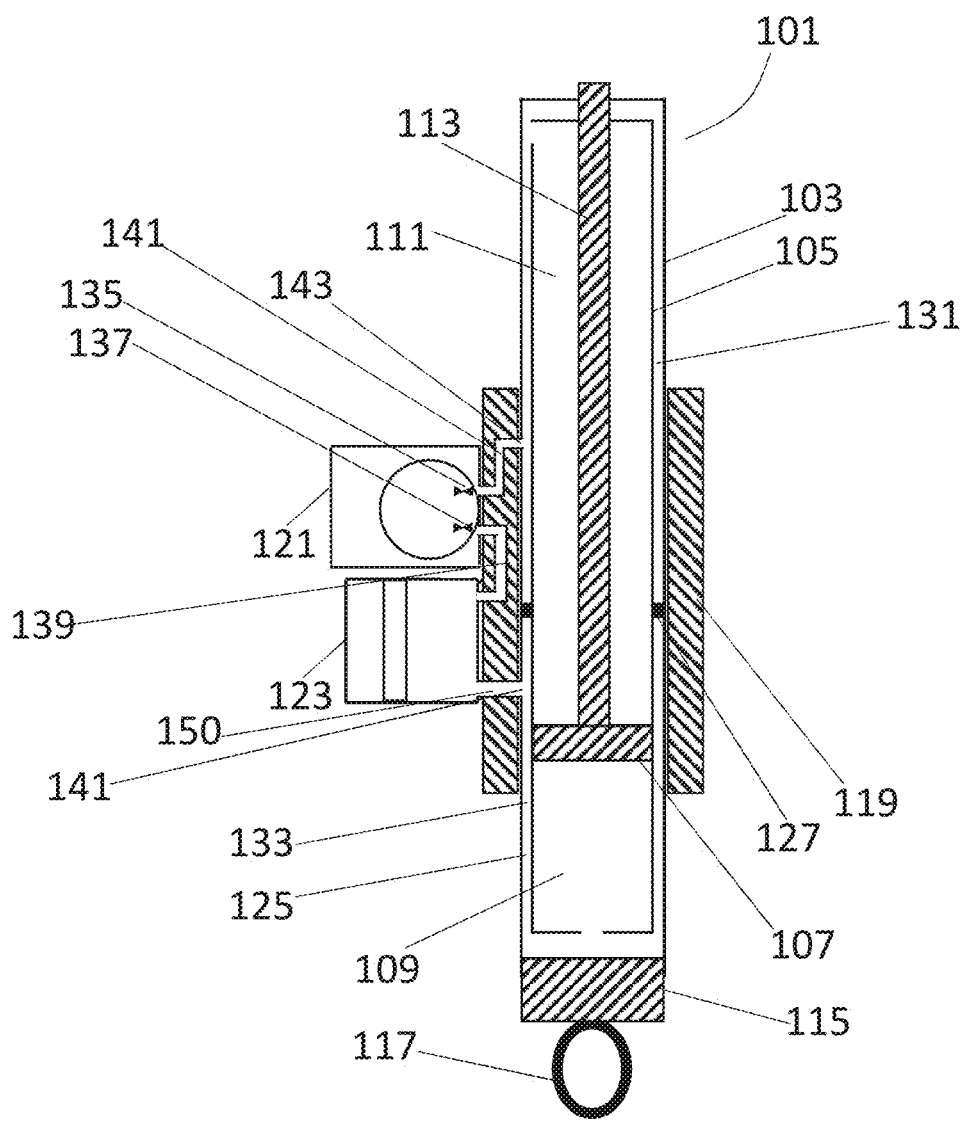
FIG. 1 depicts a hydraulic schematic of an exemplary active hydraulic cylinder for use in an active suspension system.

Conventional hydraulic passive suspension systems generally include a plurality of passive hydraulic dampers, each of which comprises a pressure tube containing hydraulic oil, a piston assembly inserted into the pressure tube, and one or more fluid passages that allow fluid to flow between fluid chambers of the pressure tube. Active vehicle suspension systems may augment the functionality of passive suspension systems by utilizing active hydraulic cylinders, in place of the passive hydraulic dampers, that are capable of functioning as both a hydraulic damper and a hydraulic actuator. In addition to the pressure tube, the piston, and the fluid passages found in a conventional passive damper, an exemplary active hydraulic cylinder may further include a pump that allows for active control of fluidic pressures in one or more fluid chambers of the pressure tube. Optionally, the exemplary active hydraulic cylinder may further include: (i) additional compliance (e.g., an additional accumulator), as compared to passive hydraulic dampers, that is designed to mitigate hydraulic noise introduced by use of the pump; (ii) one or more valves arranged to control flow between the pump and the pressure tube; and/or (iii) one or more valves arranged to allow fluid to bypass the pump. Further, it may be desirable to design and construct each active hydraulic cylinder as a rigid, stand-alone unit, thereby avoiding the use of flexible hoses, and possibly even allowing for the fitting of an active hydraulic cylinder into a packaging envelope similar to that of a conventional passive hydraulic damper.

Due at least in part to the additional components (e.g., a pump and any additional accumulators and/or valves) found in an active hydraulic cylinder, manufacturing of active hydraulic cylinders may be more complex and/or expensive than passive hydraulic dampers. In turn, active vehicle suspension systems that rely on such active hydraulic cylinders may have system costs far exceeding those of passive vehicle suspension systems. The inventors have recognized the advantages of designing an active hydraulic cylinder such that it can be mass produced using conventional manufacturing techniques. Particularly, in one embodiment, it may be advantageous to utilize a manifold that includes a circular opening designed to receive an outer tube of a multi-tube (e.g., twin tube or triple tube) assembly. Alternatively, the manifold may have a circular opening configured to receive a body cap that is then inserted into one end of the multi-tube assembly. In either embodiment, the manifold may serve to fluidly and mechanically couple the pump to the multi-tube assembly (e.g., via the outer tube), and may allow for the multi-tube assembly to be assembled using techniques substantially similar to conventional techniques known for the manufacture of twin-tube or tri-tube hydraulic dampers.

Turning now to the figures, several non-limiting, exemplary embodiments of various vehicles, suspension systems and suspension system components are now described in detail. It should be understood that the various systems, components, features, and methods described relative to these embodiments may be used either individually and/or in any desired combination as the disclosure is not limited to only the specific embodiments described herein.

FIG. 1 illustrates a schematic of an exemplary active hydraulic cylinder that may be incorporated into an active vehicle suspension system. The active hydraulic cylinder may include a twin tube assembly 101 comprising an outer tube 103 at least partially surrounding an inner tube, referred to herein as a pressure tube 105. In the illustrated embodiment, an annular volume 125 is partially defined an inner surface of the outer tube 103 and an outer surface of the pressure tube 105. This annular volume 125 may be separated into a first portion 133 and a second portion 131 by a sealing element, for example, an o-ring 127 that hydraulically separates the first and second portions by sealing against the inner surface of the outer tube 103 to the outer surface of the pressure tube 105. The sealing element may be located anywhere along the length of the pressure tube. In the illustrated embodiment, a piston 107 is slidably inserted into the pressure tube 105 and divides the pressure tube 105 into a compression fluid chamber 109 and an extension fluid chamber 111. A piston rod 113 may be attached to the piston 107 and may extend through the extension chamber 111 and protrude from one end of the outer tube 103. A rod guide (not pictured) may slidably support the piston rod as the piston rod 113 slides in and out of the pressure tube 105, and may be attached to the outer tube 103 using any appropriate type of connection. The distal end of the outer tube 103 from the rod guide may be plugged with a body cap 115 that optionally includes an eyelet 117. The body cap 115 may be welded to the outer tube 103, or it may be secured by other suitable methods such as, for example, threaded fasteners or connections. Although not shown, it is understood that the piston 107 may include one or more valves (e.g., blow-off valves or bypass valves that may control flow between the extension chamber and the compression chamber) and/or that the pressure tube 105 may incorporate one or more valves (e.g., a base valve located at the base of the pressure tube 105 that may control flow between the compression chamber 109 to the annular volume 125).

In the illustrated embodiment of FIG. 1, the outer tube 103 is inserted into a substantially circular opening of a manifold 119, such that at least a portion of the outer tube 103 is encircled by the manifold 119. The manifold 119 may serve to mechanically and/or fluidly couple a pump assembly 121 to the twin tube assembly 101 including the inner and outer tubes. Optionally, the manifold may also mechanically and/or fluidly couple other components including, for example, an external accumulator assembly 123 to the outer tube 103 of the twin-tube assembly 101. In the illustrated embodiment, the manifold 119 includes a plurality of flow channels formed therethrough that form a plurality of apertures on the inner surface of the circular opening. The plurality of openings on the inner surface of the circular opening of the manifold 119 may be aligned with a plurality of apertures in the outer tube 103. The manifold 119 may be rigidly attached to the outer tube 103 (e.g., by welding or threaded connection) and sealed against the outer tube 103 using one or more sealing elements such as, for example, elastomeric o-rings. The manifold 119 may further include a mounting section that is configured to receive the pump assembly 121 that includes a pump and a pump housing. In certain embodiments, a hydraulic motor may be used in place of the pump. In certain embodiments, the pump may be capable of operating as both a hydraulic pump in a first mode of operation and as a hydraulic motor in a second mode of operation. In certain embodiments, the pump assembly may include an electric motor (e.g., a BLDC motor) and/or associated electronic circuitry to drive the electric motor. The pump housing may be attached to the mounting section of the manifold 119, e.g. via one or more threaded fasteners (e.g., nuts and bolts) or through a joining process such as, for example, welding or brazing. Optionally, the manifold 119 may include a second mounting section for receiving an accumulator assembly 123, and the accumulator assembly 123 may attach to the second mounting section of the manifold 119, e.g. via one or more threaded connections or through a joining process such as, for example, welding or brazing.

In certain embodiments, the pump assembly 121 includes a first port 137 and a second port 135. When the active hydraulic cylinder is assembled, a first flow path may be present that hydraulically connects the first port 137 of the pump to the compression chamber 109. The first flow path may include the first port of the pump, a first fluid channel 139 passing through the manifold, a first aperture 141 through the wall of the outer tube 103, and the first portion 133 of the annular volume 125. As illustrated, the first flow path may allow fluid to flow from the first port 137 of the pump, into a first portion 133 of the annular volume 125, and through the base of the pressure tube 105 and into the compression chamber 109. It is understood that the first flow path may include one or more valves (not shown), including, for example, a base valve located at the base of the pressure tube 105 and/or a semi-active valve. Likewise, a second flow path may be formed from the second port 135 of the pump to the extension chamber 111. The second flow path may include the second port 135 of the pump, a second fluid channel passing 141 through the manifold, and a second aperture 143 through the wall of the outer tube 103. As illustrated, the second flow path may allow fluid to flow from the second port of the pump, into the annular volume between the outer tube and the pressure tube via the manifold, and through an aperture through a wall of the pressure tube and into the extension chamber. It should be understood that the second flow path may include one or more valves (not shown), including for example a semi-active valve, a check valve, or a blow off valve. In certain embodiments, one or more hydraulic seals (not pictured) may be used between the surface of the circular opening of the manifold and the outer surface of the outer tube. These seals may substantially prevent fluid communication between distinct fluid channels in the manifold at the interface with the outer tube. As illustrated, a twin tube assembly is utilized with an o-ring 127 being used to seal the first flow path from the second flow path within the annular volume. In other embodiments, a tri-tube assembly may be utilized.

In addition to offering the above referenced benefits with respect to manufacturing and assembly, use of a manifold that surrounds at least a portion of the outer tube may offer additional structural advantages. For example, during use in a vehicle, it may be desirable to have the outer tube support the compressive and tensile loads that occur during rebound and jounce of the suspension system of the vehicle. It may therefore be desirable to have the outer tube be a single continuous tube. Since the outer tube may support substantially the entire rebound and jounce loads of the vehicle, with only minimal if any load being transferred through the manifold, it may be possible to construct the manifold of a material of construction that is lighter weight and/or that has relatively less strength compared to the material of construction of the outer tube. In certain embodiments, the outer tube may be constructed out of a first material of construction and the manifold may be constructed out of a second material of construction. In certain embodiments, as the outer tube is configured to carry tensile and compressive loads, the first material of construction may have a tensile strength (e.g., ultimate tensile strength), compressive strength (e.g., ultimate compressive strength), and/or yield strength that is greater than the second material of construction (e.g., as measured by ISO 6892-1 or ASTM E8). In certain embodiments, the second material of construction may be have a density less than that of the first material of construction. In some embodiments, the outer tube may be constructed, for example, from steel, due to its known mechanical properties and construction methods, though other materials of sufficient strength may be utilized. In some embodiments the manifold may be constructed from aluminum or an alloy thereof, whereby it is relatively easy, using known techniques, to create complex flow passages via, for example, drilled holes, milled cavities, cast pockets, etc. Additionally, the use of aluminum may facilitate large-scale manufacturing of the manifold through use of casting techniques or machining known in the art. Regardless of the specific material of construction, in certain embodiments the manifold may be constructed using a casting process.

In some embodiments in order to minimize axial stresses in manifold 119, the manifold 119 may be fixedly attached to a multi-tube assembly by, for example, welding or brazing substantially at a first end while the second end is slidably sealed by, for example, an elastomeric seal such as an o-ring that seals the surface of the circular opening of the manifold to the outer surface of the outer tube. In such embodiments, the manifold may be exposed to no or effectively no axial loads that are transmitted through the outer tube (e.g., loads due to jounce or rebound of the suspension system during vehicle operation).

In view of the above, use of a substantially continuous outer tube that supports tensile and compressive loads in conjunction with a manifold that surrounds the outer tube and fluidly couples the pump to the outer tube may provide for sufficient structural integrity while still allowing use of an aluminum or aluminum alloy to couple the pump assembly to the outer tube. In some embodiments, most or effectively all compressive and tensile loads that are transmitted during use may pass substantially directly through the outer tube, and not through the manifold. The manifold may therefore be subjected only to internal loads (such as internal pressures or stresses due to operation of the pump). This arrangement may improve the structural integrity of the active suspension actuator assembly, as well as reduce cost in mass production. While some embodiments may utilize a steel outer tube and aluminum or aluminum alloy manifold, it is understood that these components could be manufactured from any suitable material.

Figure 2:
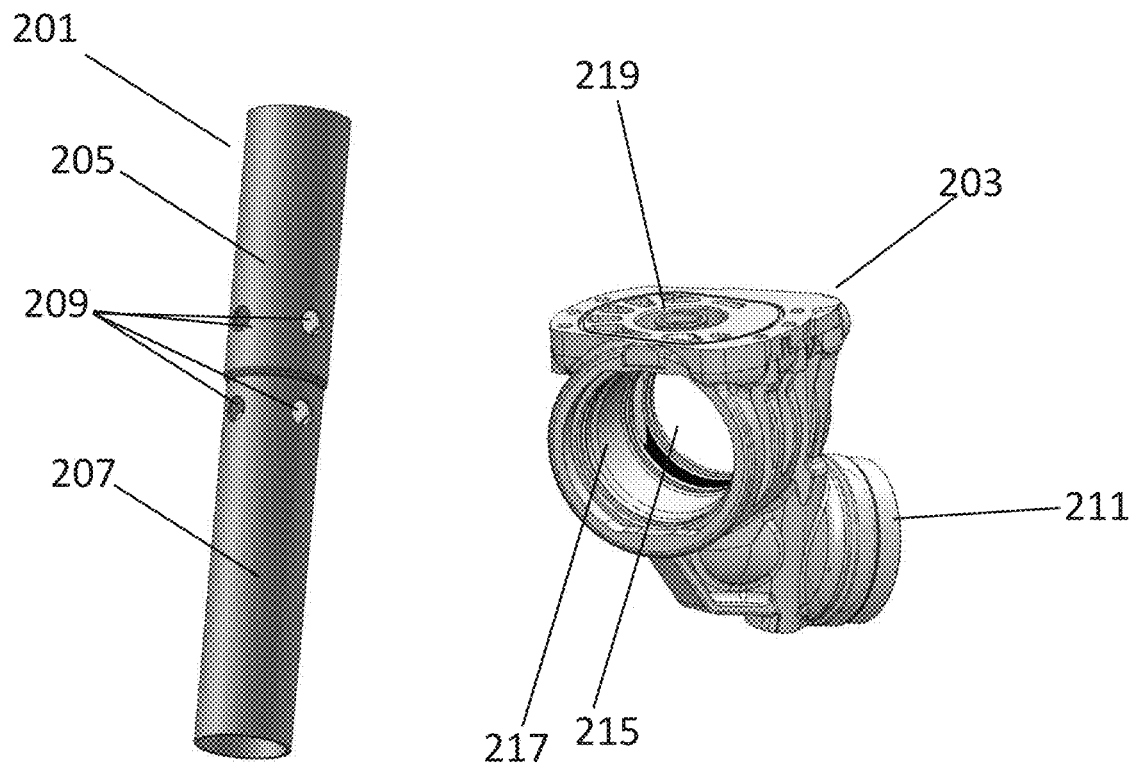
FIG. 2 depicts an exemplary outer tube and a manifold prior to assembly.

FIG. 2 illustrates a rendering of an embodiment of an outer tube 201 and a manifold 203, prior to assembly, for use in a hydraulic active cylinder. In the illustrated embodiment, the outer tube 201 is a single structure that comprises a first tubular region 205 and a second tubular region 207. The first tubular region 205 may have a first inner diameter and a first outer diameter, and the second tubular 207 region may have a second inner diameter and a second outer diameter. In various embodiments, the first inner diameter may differ from the second inner diameter and/or the first outer diameter may differ from the second outer diameter. Use of an outer tube having two tubular regions with different diameters may facilitate assembly and alignment of the manifold 203 around the outer tube 201.

The manifold 203 may include a substantially circular opening 215 that may be configured to receive at least a portion of the outer tube 201. The manifold 203 may further include a plurality of flow channels passing therethrough. The surface 217 of the circular opening 215 may include a plurality of apertures (not shown) that, when assembled, align with the corresponding apertures in the outer tube 209 so as to allow the exchange of fluid between one or more volumes encompassed by the outer tube 201 and flow channels in the manifold 203. The manifold 203 also may include, for example, a first mounting region 219 for receiving a pump assembly, and optionally a second mounting region 211 for receiving an external accumulator assembly.

To assemble the hydraulic active cylinder, one end of the outer tube 201 may be inserted into the circular opening 215 in the manifold 203, and the manifold 203 may slide over the outer tube 201 so that the plurality of apertures 209 through the wall of the outer tube 201 may effectively align with the plurality of apertures on the surface of the circular opening on the manifold 203. In certain embodiments, alignment may be achieved using a fixturing process. In certain embodiments, the outer surface of the outer tube 201 may include a mating feature such as an extrusion, an indentation, flat area, shoulder, key, etc. and the circular opening of the manifold 203 may include a corresponding mating feature (such as a groove/indentation that corresponds to an extrusion in the surface of the outer tube, an extrusion that corresponds to an indentation in the surface of the outer tube, a flat area that corresponds to a flat area in the outer tube, a key hole that corresponds to a key in the outer tube, or a shoulder that corresponds to a shoulder in the outer tube) configured to mate to the associated feature of the outer tube 201. These mating features (which may be produced by machining or other suitable techniques) may help radially and/or axially align the manifold 203 to the outer tube 201 prior to attachment. With the apertures 209 of the outer tube wall and the apertures in the surface of the circular opening of the manifold aligned, the manifold 203 may then be sealed and affixed to the outer tube 201. In certain embodiments, the manifold 203 may be welded to the outer tube 201, e.g. via electromagnetic pulse welding. Such a manufacturing process may allow for rapid and cost effective mass production, while providing a sufficiently strong and pressure tight connection between components of the hydraulic active cylinder. In other embodiments, the manifold 203 may be affixed to the outer tube 201 via a threaded connection (e.g., a threaded locknut).

In certain embodiments, the surface 207 of the opening 205 of the manifold may seal to the outer surface of the outer tube using a sealing element such as, for example, an elastomeric o-ring. In certain embodiments, the surface of the circular opening 217 of the manifold 203 may include one or more grooves (not illustrated) for retaining an o-ring. Alternatively or additionally, the outer surface of the outer tube 201 may include one or more grooves. In any case, an o-ring may be placed into each of the one or more grooves prior to insertion of the outer tube 201 into the circular opening of the manifold 203. These o-rings may hydraulically seal the surface of the circular opening of the manifold 203 against the outer surface of the outer tube 201. In certain embodiments, if multiple o-rings are utilized to seal the manifold 203 to the outer tube 201, then each of the o-rings may be sized the same so as to facilitate assembly (e.g., the same assembly tooling can be used for both and reducing the possibility of confusion in selecting the correct seal for each position). Though embodiments in which different sized o-rings are used are also contemplated as the disclosure is not so limited. Advantageously, an electromagnetic pulse (EMP) welding process may be used to affix the manifold to the outer tube with the sealing o-rings already in place, since such EMP welding processes may result in highly localized heating. Alternatively or additionally, other sealing methods may be used to seal the manifold to the outer tube including, for example, a press fit, square rings, or metal seals. In embodiments where the outer tube features two tubular regions having different diameters, the manifold may preferably hydraulically seal to the tubular region having the larger outer diameter.

Figure 3:
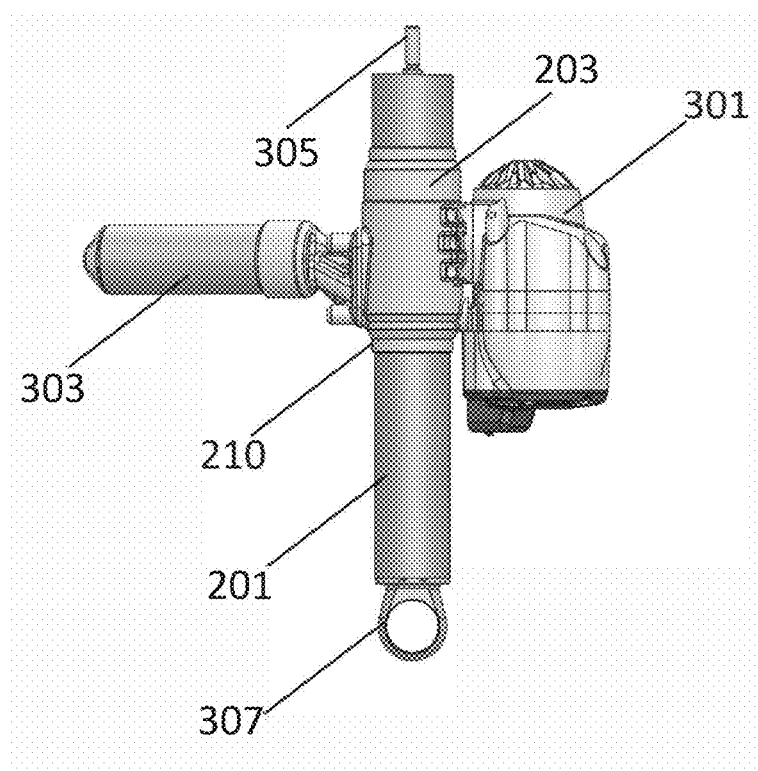
FIG. 3 depicts an exemplary active hydraulic cylinder after assembly.

FIG. 3 illustrates a rendering of an exemplary active hydraulic cylinder after assembly. The active hydraulic cylinder has been assembled by (a) inserting the outer tube 201 into the circular opening of the manifold 203 such that the manifold 203 surrounds a portion of the of the length of the outer tube 201; (b) aligning a plurality of holes through a wall of the outer tube 201 with a plurality of corresponding holes in a surface of the circular opening; and (c) attaching the manifold 203 to the outer tube 201 (e.g., via welding (such as pulse welding), brazing, or threaded connections 210). The illustrated embodiment further includes a pump assembly 301 mounted on the first mounting section of the manifold 203, and an accumulator assembly 303 mounted on the second mounting section of the manifold 203. A pressure tube containing a piston (not visible) attached to a piston rod 304 is inserted into the pressure tube 105, such that the piston rod 305 extends from one end of the outer tube 201. The other end of the outer tube 201 is plugged with a body cap including an eyelet 307. In certain applications, such as for example those where production volumes may be relatively small, it may be desirable to fix the manifold 203 to the outer tube 201 by mechanical means such as a threaded fastener or connection (e.g., a threaded locknut). In these embodiments, the locknut itself may be further fixed by a secondary means such as, for example, a thread retaining compound to prevent loosening during use.

In certain embodiments, as shown in FIG. 1, when assembled there may be a first flow path from the first port 137 of the pump assembly 121 to the compression chamber 109. The first flow path may include both a first fluid channel 139 in the manifold 141 and a first portion 133 of the annular volume 125. The first flow path may also include flow through a volume of an accumulator 123. In certain embodiments, the first flow path may begin at the first port 137 of the pump, flow through a first flow channel 139 in the manifold, into a first port of an accumulator 123, out of a second port of the accumulator 123, optionally through a second flow channel 150 in the manifold, through an aperture 141 in a wall of the outer tube 103, through a first portion 133 of the annular volume between the outer tube and the pressure tube, and finally into the pressure tube (e.g., via a base valve or an aperture in a wall of the pressure tube).

In certain embodiments, when assembled there may be a second flow path from the second port 135 of the pump to the extension chamber. The second flow path may include both a second fluid channel 141 in the manifold and a second portion 131 of the annular volume 125 between the outer tube and the pressure tube. The second flow path may also include flow through an accumulator (not shown). In certain embodiments, the second flow path may begin at the second port of the pump, flow through a first flow channel in the manifold, into a first port of an accumulator, out of a second port of the accumulator, optionally through a second flow channel in the manifold, through an aperture in a wall of the outer tube, through a portion of the annular volume between the outer tube and the pressure tube, and finally into the pressure tube (e.g., via a valve or through an aperture in a wall of the pressure tube).

In certain embodiments, when assembled there may be a bypass flow path from the compression chamber and to the extension chamber that does not require flow through the pump. In certain embodiments, the bypass flow path may include a flow channel in the manifold. In certain embodiments, the bypass flow path may allow fluid to pass from the compression chamber to a first portion of the annular volume (e.g., via a base valve or an aperture in a wall of the pressure tube), through a fluid channel in the manifold, to a second portion of the annular volume, and into the extension chamber (e.g., via a valve or an aperture in a wall of the pressure tube).

In certain embodiments, a sleeve may be located in the annular volume between the outer tube and the pressure tube. Flow to and from the compression and/or flow to and from the extension chamber may pass through the sleeve. In certain embodiments, a single sleeve is used for both flow to/from the extension chamber and for flow to/from the compression chamber. In these embodiments, an o-ring may be used to hydraulically seal the annular volume to form a first annular sleeve and a second annular sleeve. Alternatively, two separate sleeves may be utilized. In certain embodiments, the sleeve may be retained by a rod guide assembly, and may be manufactured via threading, forming, rolling, welding, or other suitable techniques.

In certain embodiments, the manifold may have a first mounting section onto which a pump assembly may be mounted. The pump assembly may include a pump and a pump housing. The pump assembly may mount to the first receiving region via threaded fasteners (e.g., nuts and bolts, screws, etc.), or it may be mounted by other processes such as, for example, welding or brazing. In a preferred embodiment, the pump housing may be constructed of aluminum or an alloy thereof. In certain embodiments, the manifold may have a second mounting region onto which an accumulator assembly may be mounted. The accumulator assembly 303 may include an accumulator housing that contains a gas volume and a fluid volume separated by a barrier (e.g., a floating piston, a bladder, a gas bag). The accumulator assembly 303 may mount onto the manifold 203 via threaded fasteners (e.g., nuts and bolts, screws, etc.), or it may be mounted by other processes such as, for example, welding or brazing. In some embodiments, the accumulator housing is constructed of aluminum or an alloy thereof. In certain embodiments, the manifold 203 itself may be constructed such that it houses an accumulator. In certain embodiments, in addition or in place of an accumulator external to the twin tube assembly, an accumulator may be located within the annular volume between the outer tube and the pressure tube (or, in case of a tri-tube assembly, in the annular volume between a first outer tube and a second outer tube). For example, a gas bag or a bladder may be located in the annular volume.

Figure 4:
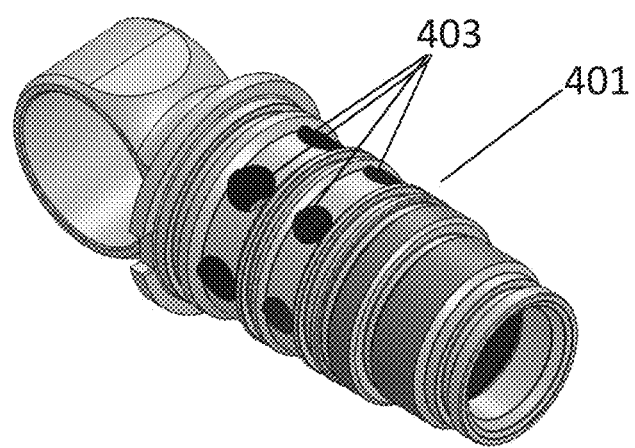
FIG. 4 depicts a body cap for use with a manifold.

In certain applications, it may be advantageous to locate the pump assembly 301 substantially toward one end of the active hydraulic cylinder. In certain embodiments, the manifold 203 may be located around, and retained by, the body cap rather than the outer tube 201. FIG. 4 illustrates a rendering of an embodiment of a body cap 401 configured to retain a manifold. The body cap 401 may include a plurality of apertures 403. A portion of the body cap 401 may be inserted into an opening of the manifold 203, and the plurality of apertures of the body cap 401 may be aligned with a plurality of apertures of the manifold 203. The manifold 203 may then be affixed to the body cap 401, e.g. by welding, brazing, or by a threaded connection (such as a threaded locknut). A first end of the body cap 401 may then be used to plug a base of an outer tube of a twin-tube or tri-tube assembly, and may be attached and sealed to the outer tube (e.g., via a threaded connection, welding, brazing, etc.). A second end of the body cap may include an eyelet.

Figure 5:
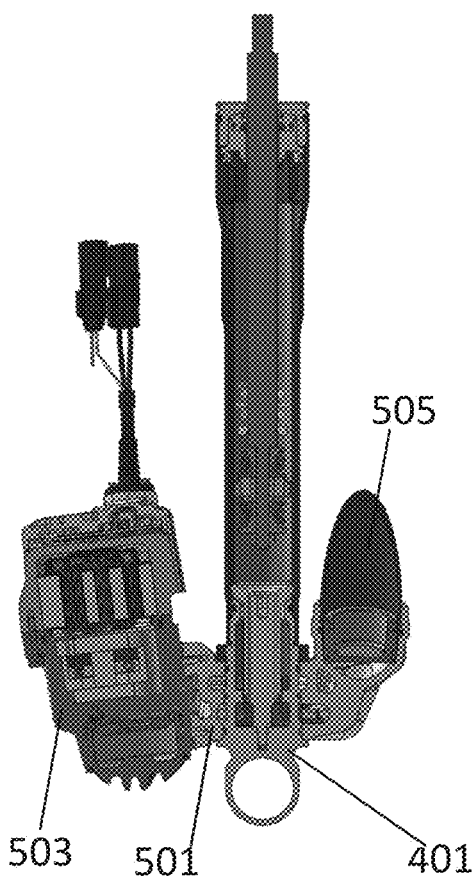
FIG. 5 depicts an exemplary active hydraulic cylinder wherein the manifold is retained by the body cap.

FIG. 5 illustrates a rendering of an embodiment of an active hydraulic cylinder in which a manifold 501 surrounds, and is retained by, a body cap 401. Similar to the embodiments in which the manifold is retained by the outer tube, a pump assembly 503 and other optional components (e.g., an external accumulator assembly 505) may then be mounted onto the manifold 501. A first flow path may be formed between the first port of the pump, through the manifold 501, through a first aperture of the body cap 401, to a portion of the annular volume between the outer tube and the pressure tube, and into the compression chamber (e.g., via a base valve). A first flow path may be formed between the first port of the pump, through a first flow channel in the manifold 501, through a first aperture of the body cap 401, to a first chamber in the annular volume between the outer tube and the pressure tube, and into the compression chamber (e.g., via a base valve). A second flow path may be formed between the second port of the pump, through a second flow channel in the manifold 501, through a first aperture of the body cap 401, to a second chamber in the annular volume between the outer tube and the pressure tube, and into the extension chamber (e.g., via an aperture through a wall of the pressure tube). The first fluid flow path and/or second fluid flow path may optionally include one or more compliance elements (e.g., an accumulator), restriction elements (e.g., fluid restrictions) and/or inertance elements (e.g., sleeves or coils). One or more sealing elements may be used, similar to those discussed for other embodiments above, for sealing the manifold 501 to the body cap 401 and/or for sealing the manifold 501 to the outer tube. In this embodiment, the outer tube may be a single piece without any apertures through the wall of the outer tube.

While the outer tube is preferably cylindrical (that is, it has a substantially circular cross sectional area) and the opening through the manifold is substantially circular, in alternate embodiments the outer tube may have any cross-sectional geometry. In embodiments in which the outer tube does not have a substantially circular cross sectional area, the opening 215 through the manifold may have a non-circular geometry that is configured to receive the outer tube (e.g., if a rectangular tube is used for the outer tube, then the opening through the manifold may have a substantially rectangular cross section).

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only. Further, unless explicitly described, the various steps taken in the manufacturing or assembly methods described and claimed herein above may be carried out in any chronological order.

The invention claimed is:

1. An actuator, comprising:
a single continuous pressure tube forming an internal volume;
a piston slidably received in the pressure tube, wherein the piston separates the internal volume into a first volume and a second volume;
a piston rod with a first end attached to the piston and a second end that protrudes from one end of the pressure tube;
a single continuous outer tube with a first end and a second end, and wherein the outer tube is constructed from a first material;
an annular volume partially defined by an inner surface of the outer tube and an outer surface of the pressure tube, wherein the annular volume is separated into a first annular volume and a second annular volume;
a manifold, constructed from a second material different than the first material, with a circular opening that surrounds the pressure tube, wherein the second material is less dense that the first material, wherein the first material has a higher ultimate compressive strength than the second material, wherein the manifold includes at least a first flow path and a second flow path, and wherein the manifold is fixedly attached to the outer tube at one end of the manifold; and
a pump assembly attached to the manifold, wherein the pump assembly includes a pump with a first port and a second port, wherein the first port is fluidly connected to the first volume via the first flow path and the first annular volume, and wherein the second port is fluidly connected to the second volume via the second flow path and the second annular volume;
wherein the outer tube is configured and positioned to support at least one load selected from the group of a jounce load and a rebound load, to minimize an axial stress in the manifold.

2. The actuator of claim 1, wherein the outer tube is further configured and positioned to support the larger share the load relative to the manifold.

3. The actuator of claim 1, wherein the first material is steel and the second material is at least one selected from the group of aluminum and an aluminum alloy.

4. The actuator of claim 1, wherein the first volume is a compression volume, and the second volume is an extension volume.

5. The actuator of claim 1, wherein the first flow path includes a first aperture through a wall of the outer tube and the second flow path includes a second aperture through the wall of the outer tube.

6. The actuator of claim 1, wherein the manifold is fixedly attached to the outer tube a threaded connection.

7. The actuator of claim 1, wherein the outer tube and the pressure tube for a twin tube assembly.

8. The actuator of claim 1, wherein the pump assembly includes an electric motor.

9. The actuator of claim 8, wherein the electric motor is a BLDC motor.

10. The actuator of claim 1, wherein the actuator is an active suspension actuator.

11. An actuator, comprising:
a single continuous pressure tube forming an internal volume;
a piston slidably received in the pressure tube, wherein the piston separates the internal volume into a first volume and a second volume;
a piston rod with a first end attached to the piston and a second end that protrudes from one end of the pressure tube;
a single continuous outer tube with a first end and a second end, and wherein the outer tube is constructed from a first material;
an annular volume partially defined by an inner surface of the outer tube and an outer surface of the pressure tube, wherein the annular volume is separated into a first annular volume and a second annular volume;
a manifold, constructed from a second material different than the first material, with a circular opening that surrounds the pressure tube; and
a pump assembly attached to the manifold, wherein the pump assembly includes a pump with a first port and a second port;
wherein the outer tube is configured and positioned to support the larger share of a jounce load and a rebound load, relative to the manifold.

12. The actuator of claim 11, wherein the second material is less dense that the first material, wherein the first material has a higher ultimate compressive strength than the second material, wherein the manifold is fixedly attached to the outer tube at one end of the manifold; wherein the manifold includes at least a first flow path and a second flow path; wherein the first port is fluidly connected to the first volume via the first flow path and the first annular volume, and wherein the second port is fluidly connected to the second volume via the second flow path and the second annular volume.

* * * * *